US008439266B2

(12) United States Patent
Kawashima et al.

(10) Patent No.: US 8,439,266 B2
(45) Date of Patent: May 14, 2013

(54) OPTICAL-INFORMATION-READING APPARATUS

(75) Inventors: Yasutake Kawashima, Saitama (JP); You Tanaka, Saitama (JP); Satoshi Komi, Saitama (JP)

(73) Assignee: Optoelectronics Co. Ltd. (JP)

( * ) Notice: Subject to any disclaimer, the term of this patent is extended or adjusted under 35 U.S.C. 154(b) by 0 days.

(21) Appl. No.: 13/459,969

(22) Filed: Apr. 30, 2012

(65) Prior Publication Data

US 2012/0261474 A1 Oct. 18, 2012

Related U.S. Application Data

(63) Continuation of application No. PCT/JP2010/069432, filed on Nov. 1, 2010.

(30) Foreign Application Priority Data

Oct. 30, 2009 (JP) .................................. 2009-251408

(51) Int. Cl.
G03B 7/08 (2006.01)
G06K 5/00 (2006.01)
G06K 7/10 (2006.01)
G06K 7/14 (2006.01)

(52) U.S. Cl.
USPC ............ 235/462.24; 235/462.11; 235/462.41

(58) Field of Classification Search ............. 235/462.24, 235/462.23, 462.22, 375, 462.32, 462.41, 235/462.11
See application file for complete search history.

(56) References Cited

U.S. PATENT DOCUMENTS

| 6,141,105 A | 10/2000 | Yahashi et al. |
| 2007/0097508 A1* | 5/2007 | Ohtake et al. .................. 359/557 |
| 2008/0110265 A1* | 5/2008 | Wong et al. ..................... 73/627 |
| 2010/0040355 A1* | 2/2010 | Craen et al. ..................... 396/90 |
| 2012/0199655 A1* | 8/2012 | Fukuba .......................... 235/455 |

FOREIGN PATENT DOCUMENTS

| JP | 04264511 | 9/1992 |
| JP | 10002711 | 1/1998 |
| JP | 2001221621 | 8/2001 |
| JP | 2002056348 | 2/2002 |
| JP | 2005182117 | 7/2005 |
| JP | 2008123562 | 5/2008 |
| JP | 2009086584 | 4/2009 |
| JP | 2009134023 | 6/2009 |

OTHER PUBLICATIONS

Yukari Nakamura, "International Patent Application No. PCT/JP2010/069432 International Preliminary Report on Patentability", Dec. 14, 2010, Publisher: PCT, Published in: JP.

"International Patent Application Number: PCT/JP2010/069432 International Search Report", Dec. 14, 2010, Publisher: PCT, Published in: JP.

\* cited by examiner

Primary Examiner — Edwyn Labaze
(74) Attorney, Agent, or Firm — Kaplan Breyer Schwarz & Ottesen, LLP

(57) ABSTRACT

An optical-information-reading apparatus includes an imaging optical system having a varifocal lens that adjusts a focal position, a solid-state image sensing device that images a code symbol, a ranging laser that measures a distance to the code symbol, and a decoder that calculates the distance to the code symbol using the ranging laser. The apparatus controls the varifocal lens based on calculated distance information.

10 Claims, 13 Drawing Sheets

| SAMPLES | 1 | 2 |
|---|---|---|
| DISTANCE [mm] | CALCULATED VALUE [mm] | CALCULATED VALUE [mm] |
| 70 | 70 | 70 |
| 100 | 100 | 100 |
| 150 | 148 | 148 |
| 200 | 195 | 193 |
| 250 | 242 | 241 |
| 500 | 471 | 463 |
| 1000 | 909 | 870 |
| 2000 | 1696 | 1517 |

FIG. 5B

| SAMPLES | 1 | 2 | 1 | 2 |
|---|---|---|---|---|
| INVERSE NUMBER OF DISTANCE 1/x | CALCULATED VALUE[D] | CALCULATED VALUE[D] | ABSOLUTE ERROR | ABSOLUTE ERROR |
| 14.29 | 14.29 | 14.29 | 0 | 0 |
| 10 | 10 | 10 | 0 | 0 |
| 6.67 | 6.76 | 6.76 | 0.09 | 0.09 |
| 5 | 5.13 | 5.18 | 0.13 | 0.18 |
| 4 | 4.13 | 4.15 | 0.13 | 0.15 |
| 2 | 2.12 | 2.16 | 0.12 | 0.16 |
| 1 | 1.1 | 1.15 | 0.1 | 0.15 |
| 0.5 | 0.59 | 0.66 | 0.09 | 0.16 |
| AVERAGE OF WHOLE ERRORS | MAXIMUM ERROR | | AVERAGES OF ERRORS | |
| 0.096875 | 0.18 | | 0.0825 | 0.11125 |

| SAMPLES | 1 | 2 |
|---|---|---|
| DISTANCE [mm] | CALCULATED VALUE [mm] | CALCULATED VALUE [mm] |
| 70 | 74 | 64 |
| 100 | 120 | 98 |
| 150 | 220 | 159 |
| 200 | 387 | 234 |
| 250 | 721 | 333 |
| 500 | -961 | 1996 |
| 1000 | -440 | -1297 |
| 2000 | -346 | -721 |

FIG. 6A

| SAMPLES | 1 | 2 | 1 | 2 |
|---|---|---|---|---|
| INVERSE NUMBER OF DISTANCE 1/x | CALCULATED VALUE [D] | CALCULATED VALUE [D] | ABSOLUTE ERROR | ABSOLUTE ERROR |
| 14.29 | 13.51 | 15.63 | 0.78 | 1.34 |
| 10 | 8.33 | 10.2 | 1.67 | 0.2 |
| 6.67 | 4.55 | 6.29 | 2.12 | 0.38 |
| 5 | 2.58 | 4.27 | 2.42 | 0.73 |
| 4 | 1.39 | 3 | 2.61 | 1 |
| 2 | −1.04 | 0.5 | 3.04 | 1.5 |
| 1 | −2.27 | −0.77 | 3.27 | 1.77 |
| 0.5 | −2.89 | −1.39 | 3.39 | 1.89 |

| AVERAGE OF WHOLE ERRORS | MAXIMUM ERROR | AVERAGES OF ERRORS | |
|---|---|---|---|
| 1.756875 | 3.39 | 2.4125 | 1.10125 |

| SAMPLES | 1 | 2 | 3 |
|---|---|---|---|
| IMAGE SIZE | 570X34 | 567X45 | 548X41 |
| AVERAGE PERIOD OF TIME REQUIRED TO MEASURE DISTANCE [ms] | 7.25 | 8.5 | 7.375 |
| DISTANCE [mm] | PERIOD OF TIME REQUIRED TO MEASURE DISTANCE [ms] | PERIOD OF TIME REQUIRED TO MEASURE DISTANCE [ms] | PERIOD OF TIME REQUIRED TO MEASURE DISTANCE [ms] |
| 70 | 6 | 6 | 6 |
| 100 | 5 | 10 | 7 |
| 150 | 10 | 9 | 7 |
| 200 | 8 | 9 | 8 |
| 250 | 7 | 8 | 6 |
| 500 | 7 | 10 | 7 |
| 1000 | 8 | 9 | 10 |
| 2000 | 7 | 7 | 8 |

| SAMPLES | 1 | 2 | 3 |
|---|---|---|---|
| IMAGE SIZE | 860X200 | 860X200 | 860X200 |
| AVERAGE PERIOD OF TIME REQUIRED TO MEASURE DISTANCE [ms] | 17.5 | 17.75 | 17 |
| DISTANCE [mm] | PERIOD OF TIME REQUIRED TO MEASURE DISTANCE [ms] | PERIOD OF TIME REQUIRED TO MEASURE DISTANCE [ms] | PERIOD OF TIME REQUIRED TO MEASURE DISTANCE [ms] |
| 70 | 17 | 19 | 17 |
| 100 | 17 | 18 | 16 |
| 150 | 20 | 18 | 16 |
| 200 | 16 | 16 | 15 |
| 250 | 17 | 17 | 16 |
| 500 | 17 | 18 | 19 |
| 1000 | 19 | 18 | 19 |
| 2000 | 17 | 18 | 18 |

FIG. 17
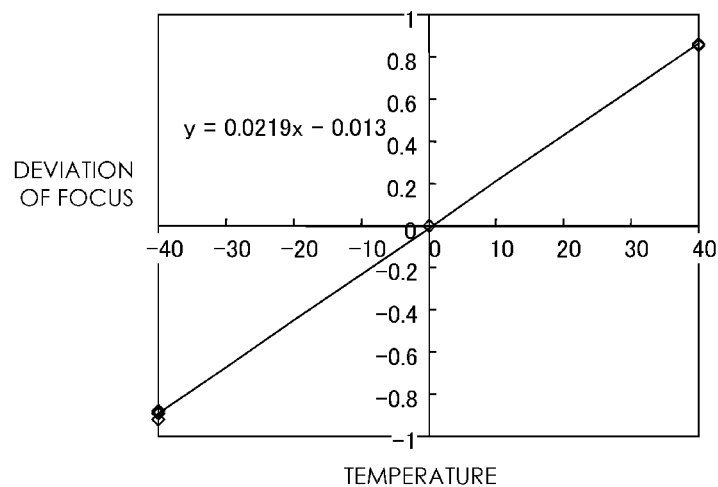
FIG. 18A
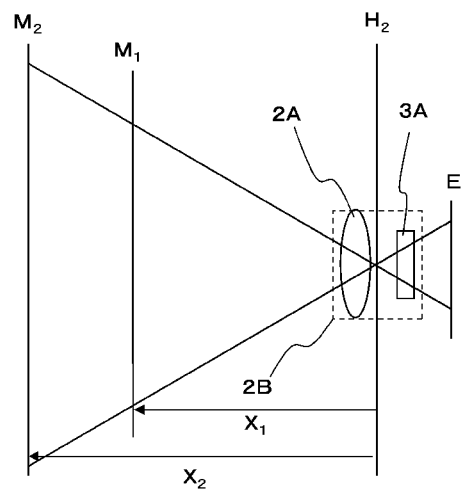
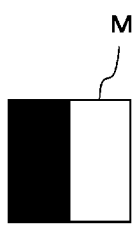
FIG. 18B

FIG.19

| | | 20 °C | | | | | | -20 °C | | | | | | 60 °C | | | | | |
|---|---|---|---|---|---|---|---|---|---|---|---|---|---|---|---|---|---|---|---|
| | | INPUTS | | ERRORS | | | | INPUTS | | ERRORS | | | | INPUTS | | ERRORS | | | |
| | Z | V | V(A) | V(B) | A | B | C | V | V(A) | V(B) | A | B | C | V | V(A) | V(B) | A | B | C |
| SAMPLE 1 | 666.7 | 40.7 | 41.2 | 40.9 | 0.5 | 0.2 | 0.2 | 43 | 42.6 | 41 | 0.4 | 2 | 2.1 | 36.8 | 37 | 38.2 | 0.2 | 1.4 | 4.1 |
| | 500 | 41.4 | 41.8 | 41.8 | 0.4 | 0.4 | 0.4 | 43.7 | 43.4 | 41.7 | 0.3 | 2 | 1.9 | 37.9 | 37.8 | 39.1 | 0.1 | 1.2 | 3.9 |
| | 250 | 44.8 | 45.5 | 45.2 | 0.7 | 0.4 | 0.4 | 46.8 | 46.4 | 44.7 | 0.4 | 2.1 | 1.6 | 41.4 | 41.3 | 42.7 | 0.1 | 1.3 | 3.8 |
| | 166.7 | 48.1 | 48.8 | 48.5 | 0.7 | 0.4 | 0.4 | 49.9 | 49.1 | 47.5 | 0.8 | 2.4 | 1.4 | 44.8 | 44.7 | 46 | 0.1 | 1.2 | 3.7 |
| | 125 | 51.2 | 52 | 51.7 | 0.8 | 0.5 | 0.5 | 53 | 51.9 | 50.2 | 1.1 | 2.8 | 1.3 | 48.1 | 47.9 | 49.2 | 0.2 | 1.1 | 3.6 |
| | | AVERAGE OF ERRORS | | | 0.62 | 0.38 | 0.38 | AVERAGE OF ERRORS | | | 0.6 | 2.26 | 1.66 | AVERAGE OF ERRORS | | | 0.14 | 1.24 | 3.82 |
| SAMPLE 2 | 666.7 | 41.4 | 41.8 | 39.8 | 0.4 | 1.6 | 1.6 | 43.63 | 42.9 | 41.8 | 0.733 | 1.833 | 3.833 | 37.8 | 37.6 | 39.1 | 0.2 | 1.3 | 2 |
| | 500 | 42.4 | 42.8 | 42.4 | 0.4 | 0 | 0 | 44.4 | 43.6 | 42.2 | 0.8 | 2.2 | 2 | 38.7 | 38.5 | 40 | 0.2 | 1.3 | 3.7 |
| | 250 | 45.8 | 46.2 | 45.8 | 0.4 | 0 | 0 | 47.6 | 46.6 | 45 | 1 | 2.6 | 1.8 | 42.2 | 41.9 | 43.6 | 0.3 | 1.4 | 3.6 |
| | 166.7 | 49.2 | 49.4 | 49.2 | 0.2 | 0 | 0 | 50.5 | 49.4 | 47.8 | 1.1 | 2.7 | 1.3 | 45.8 | 45.3 | 46.9 | 0.5 | 1.1 | 3.4 |
| | 125 | 52.5 | 52.6 | 52.3 | 0.1 | 0.2 | 0.2 | 53.5 | 52.1 | 50.6 | 1.4 | 2.9 | 1.2 | 49.2 | 48.6 | 50.2 | 0.6 | 1 | 3.1 |
| | | AVERAGE OF ERRORS | | | 0.3 | 0.36 | 0.36 | AVERAGE OF ERRORS | | | 1.007 | 2.447 | 2.027 | AVERAGE OF ERRORS | | | 0.36 | 1.22 | 3.16 |
| SAMPLE 3 | 666.7 | 42.1 | 41.8 | 41.9 | 0.3 | 0.2 | 0.2 | 43.5 | 42.9 | 41.6 | 0.6 | 1.9 | 1.6 | 38.2 | 38.1 | 39.2 | 0.1 | 1 | 3.7 |
| | 500 | 42.9 | 42.6 | 42.7 | 0.3 | 0.2 | 0.2 | 44.2 | 43.6 | 42.3 | 0.6 | 1.9 | 1.5 | 39 | 39 | 40.1 | 0 | 1.1 | 3.7 |
| | 250 | 46 | 46 | 46 | 0 | 0 | 0 | 47.3 | 46.5 | 45.2 | 0.8 | 2.1 | 1.3 | 42.4 | 42.4 | 43.5 | 0 | 1.1 | 3.6 |
| | 166.7 | 49.4 | 49.2 | 49.2 | 0.2 | 0 | 0 | 50.2 | 49.2 | 48 | 1 | 2.2 | 1 | 45.8 | 45.6 | 46.8 | 0.2 | 1 | 3.4 |
| | 125 | 52.2 | 52.3 | 52.2 | 0.1 | 0 | 0 | 53 | 51.8 | 50.5 | 1.2 | 2.5 | 0.8 | 49.2 | 48.8 | 50 | 0.4 | 0.8 | 3 |
| | | AVERAGE OF ERRORS | | | 0.18 | 0.12 | 0.12 | AVERAGE OF ERRORS | | | 0.84 | 2.12 | 1.24 | AVERAGE OF ERRORS | | | 0.14 | 1 | 3.48 |

| AVERAGE INPUT ERRORS | | | MAXIMUM INPUT ERRORS | | |
|---|---|---|---|---|---|
| A | B | C | A | B | C |
| 0.465 | 1.239 | 1.805 | 1.4 | 2.9 | 4.1 |

Z : DISTANCE [mm]   V : REAL INPUT VALUES TO VARIFOCAL LENS
A : TEMPERATURE COMPENSATION IS PERFORMED ON BOTH OF VARIFOCAL LENS AND FIXED FOCUS LENS SYSTEM.
B : TEMPERATURE COMPENSATION IS PERFORMED ON ONLY VARIFOCAL LENS.
C : NO TEMPERATURE COMPENSATION IS PERFORMED (DIFFERENCE BETWEEN V AT REFERENCE TEMPERATURE AND V AT MEASURED TEMPERATURE). HOWEVER, $\varphi_b(T_0, V_0)$ AND $s_a(T_0)$ ARE CALCULATED.

OPTICAL-INFORMATION-READING APPARATUS

This patent application is a continuation of International Application No. PCT/JP2010/069432 filed Nov. 1, 2010 and designating the United States of America. This international application was published in Japanese on May 5, 2011 under No. WO 2011/02770 A1. This international application is hereby incorporated herein by reference in its entirety.

BACKGROUND OF THE INVENTION

The present invention relates to an optical-information-reading apparatus which reads a code symbol such as a bar-code and a two-dimensional code.

The bar code, which is one-dimensional code information, is well known for use in merchandise management, inventory management, and the like. Further, the two-dimensional code has been known as a code having higher information density. A processing method has been known, according to which the two-dimensional code is imaged by a solid-state image sensing device, such as CMOS image sensor or CCD image sensor, as a device for imaging the two-dimensional code, after which various kinds of processing are performed on the image, and it is binarized and decoded.

The CMOS image sensor used in such an apparatus to read the code information has been not different from the one used for a digital camera, or the like, in a function so that it is required also to have function as a camera to normally take photographs of an object and/or a sight. For example, in the case of the inventory management, it is used when a target object and a location in which the object is stored are imaged, which are stored in a database together with code information.

A small-scaled camera using the above-mentioned CMOS image sensor is equipped for a mobile phone. The mobile phones have a camera function to take photographs of an object and/or a sight like the normal digital camera and mostly include a scanner for barcode/two-dimensional code and an optical character reader (OCR).

In a scene of the above-mentioned merchandise management, inventory management or the like, it is necessary to scan code symbols applied to objects, one object after another. At present, it is desirable to provide an autofocus function, and the autofocus function and the imaging process are required to be fast.

Generally, according to a method in wide use, a lens is arranged so as to move along an optical axis, the distance at which it focuses on the code symbol is calculated, and the lens moves to a position that is suitable for the distance (see, for example, Patent Document 1 below). Further, a simple auto-focus is in wide use according to which two lens locations of short and long ranges, in addition to a fixed lens location, are stored in a memory and, when failing to image, the lens moves in a direction of the short range or the long range (see, for example, Patent Document 2 below).

Further, an optical reading apparatus has been equipped with technology such that optical wavefront modulation elements combining a plurality of lenses are formed to have a focusing function, and focus is adjusted based on the distance to a reading target object (see, for example, Patent Document 3 below).

Additionally, technology has been disclosed such that an image lens, a prism, a lens for long range and its image sensor, and a lens for short range and its image sensor are combined to form optics, and focal distance is adjusted without moving the lenses (see, for example, Patent Document 4 below).

PRIOR ART DOCUMENTS

Patent Document 1: Japanese Patent Application Publication No. 2002-56348.
Patent Document 2: Japanese Patent Application Publication No. 2005-182117.
Patent Document 3: Japanese Patent Application Publication No. 2009-134023.
Patent Document 4: Japanese Patent Application Publication No. 2008-123562.

An optical-information-reading apparatus such as a code scanner is now required to be down-sized or integrated. Particularly, when the optical-information-reading apparatus is incorporated into a part of an apparatus, such as a mobile phone, large space capacity may not be used therefor. It is lens optics that require largest capacity in the optical-information-reading apparatus. In the Patent Documents 1 and 2, any space for allowing the lens to move must be maintained, which cannot be reduced.

In Patent Document 3, at least 5 lenses are required. Here, space for allowing the lenses to be arranged is also required. Optical wavefront modulation elements are controlled by complicated software, in which large computational complexity is required. Since it has optics with high precision, it is difficult to construct a production line thereof, which causes the costs thereof to be increased significantly.

Further, Patent Document 4 has a configuration such that at least 2 sets of the normal optics are equipped, so that a case itself is made massive, which causes the costs thereof to be increased. Although a lens, an effective aperture of which is small, is used in order to design a small optical member, such a small lens causes focus and/or image formation to become difficult, which requires a correction function and correction member to correct the inconvenience. In conclusion, it is impossible to accomplish downsizing, which causes the costs thereof to be increased.

In an optical-information-reading apparatus which reads a code symbol, when its focus has low precision, if cell patterns are complicated in a small area, particularly, such as a micro two-dimensional code, it is impossible to recognize black and white in the cells, which results in failure to read them, or causes it to take a long time to decode them. Accordingly, it is necessary to make fine adjustments to the location of the lens, or the like, after it is assembled, in order to accomplish an autofocus function which calculates the distance at which it focuses on the code symbol, which takes a lot of work and much time and increases its production costs.

Thus, the present invention solves such problems and, as an object, providing an optical-information-reading apparatus which has a simple configuration, accomplishes fast imaging of the code symbol with high precision, downsizes the apparatus itself and can be manufactured at low cost.

SUMMARY OF THE INVENTION

In order to solve the above-mentioned problem, embodiments of the present invention provide an optical-information-reading apparatus containing an imaging optical system including a varifocal lens which adjusts a focal position, imaging means that images an imaging target of which the imaging optical system performs an image formation, distance-measuring means that measures a distance to the imaging target Controlling means calculates the distance to the imaging target using the distance-measuring means, the imaging optical system is controlled based on calculated distance information to perform the image formation of the imaging target on the imaging means, and the imaging means is controlled to image the imaging target. The control unit calculates the distance to the imaging target using a distance measurement parameter which is proper to the apparatus, the distance measurement parameter to be used for the calculation of the distance to the imaging target being previously measured and the measured distance measurement parameter which is proper to the apparatus being stored.

In an optical-information-reading apparatus embodying the present invention, the distance measurement parameter to be used for the calculation of the distance to the imaging target is previously measured, the measured distance measurement parameter which is proper to the apparatus is stored, and in the reading of the imaging target such as the code symbol or the like, the distance to the imaging target is calculated using the distance measurement parameter which is proper to the apparatus, which enables an autofocus to be carried out.

Making use of the present invention, it is possible to improve the precision in a distance measurement without performing any fine adjustment in the location of lens, or the like, after assembly thereof, which enables the period of time required to autofocus, the imaging and the decoding to be shortened, thereby realizing fast imaging of the code symbol. Further, when the imaging optical system is deteriorated because of long-term deterioration, or the like, it is possible to perform control to allow the image formation of the imaging target to be performed. Particularly, in a configuration where a liquid lens is used as the varifocal lens, it is possible to compensate deterioration of the liquid lens based on temperature, or the like. Even when using it for a long time, it is possible to realize fast imaging of the code symbol. This enables a user of the apparatus to image a plurality of code symbols in succession without any stress.

BRIEF DESCRIPTION OF THE DRAWINGS

FIG. 5B is a table showing a comparison result between the measured distance and the calculated values thereof when calculating distance using location information of a ranging laser, which is measured by applying the present invention thereto.

FIG. 6A is a table showing a comparison between the measured distance and the calculated values thereof when determining location of the ranging laser based on only mechanical tolerance and calculating distance using designed values without any mechanical adjustment.

FIG. 17 is a graph showing the relationship between temperature and deviation of the focus.

FIG. 18A is an illustration of an optical system illustrating an adjustment step for obtaining an individual difference.

FIG. 18B is an illustration of an optical system illustrating an adjustment step for obtaining an individual difference.

FIG. 19 is a table showing a comparison of precision based on whether or not temperature correction is performed.

DETAILED DESCRIPTION

The following will describe embodiments of an optical-information-reading apparatus according to the present invention with reference to drawings.

Figure 1:
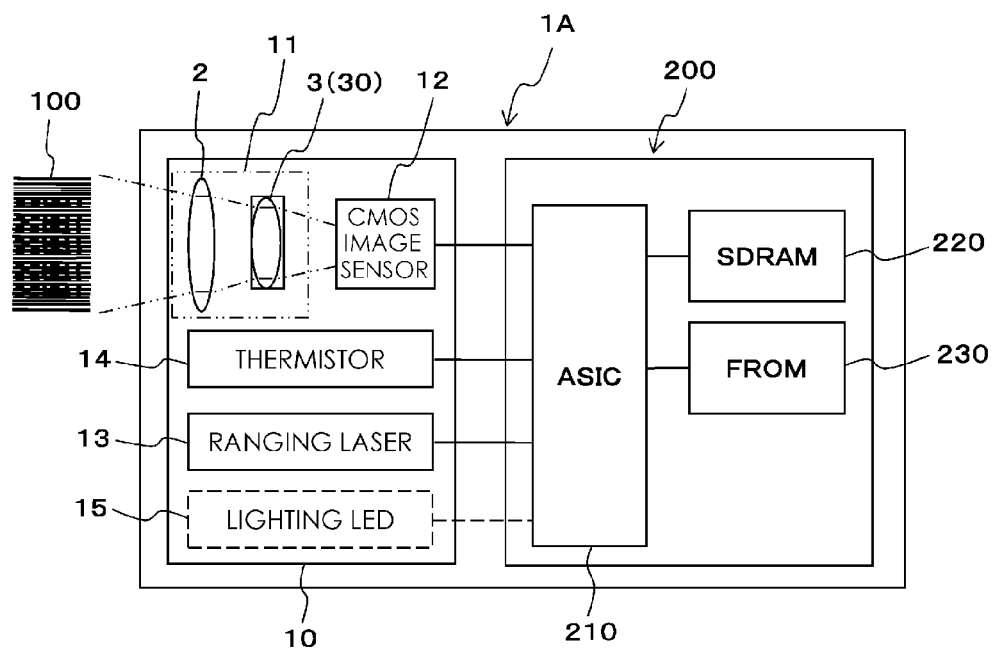
FIG. 1 is a functional block diagram showing an example of an optical-information-reading apparatus according to a first embodiment.

FIG. 1 is a functional block diagram showing an embodiment 1A of an optical-information-reading apparatus according to the present invention. The optical-information-reading apparatus 1A broadly comprises a camera module 10 that images a code symbol 100 (an imaging target), and a decoder 200 that controls the imaging, focus adjustment, decoding, and data transfer, or the like, to be performed in the camera module 10. The optical-information-reading apparatus 1A has a configuration such that any components such as the camera module 10 and the decoder 200 are installed in a case, not shown, and a user can image the code symbol 100 while having it in his hands.

The camera module 10 is provided with an imaging optical system 11 having an autofocus function for adjusting a focal position and a solid-state image sensing device 12 that images the code symbol 100, on which the imaging optical system 11 performs the image formation. A ranging laser 13 measures the distance from the solid-state image sensing device 12 to the code symbol 100.

The imaging optical system 11 is provided with a main lens 2 and a varifocal lens 3. The main lens 2 is a fixed focus lens composed of single or plural optical lens(es). The varifocal lens 3 is positioned rearward of the main lens 2 and serves to focus light transmitted through main lens 2 on the solid-state image sensing device 12.

The varifocal lens 3 may be provided with a mechanism to move the single or plural optical lens(es) mechanically along an optical axis to implement an autofocus function. On the other hand, the varifocal lens 3 may be composed of a liquid lens 30 to implement an autofocus function without using any mechanism to move the lens(es) mechanically.

Figure 2A:
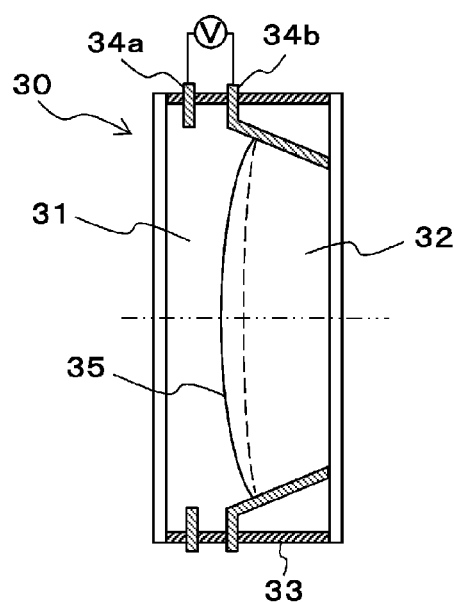
FIG. 2A is a schematic diagram showing the concept of a liquid lens.

FIG. 2A is a schematic diagram showing the concept of a liquid lens. In the liquid lens 30, solution 31 having high conductivity and insulating oil 32 are sealed in a container 33 having transparent windows through which light is transmitted at its opposed surfaces. The liquid lens 30 is provided with an electrode 34a contacting the solution 31 and an electrode 34b contacting both of the solution 31 and the oil 32 through an insulating portion.

When electricity flows through the electrodes 34a and 34b and electric voltage is applied on the solution 31, the liquid lens 30 can change the shape of the boundary surface 35 between the solution 31 and the oil 32. Such a phenomenon is referred to as "electrowetting phenomenon". By changing the curvature of the boundary surface 35 between the solution 31 and the oil 32, it is possible to move a focal position to adjust the focus thereof.

Figure 2B:
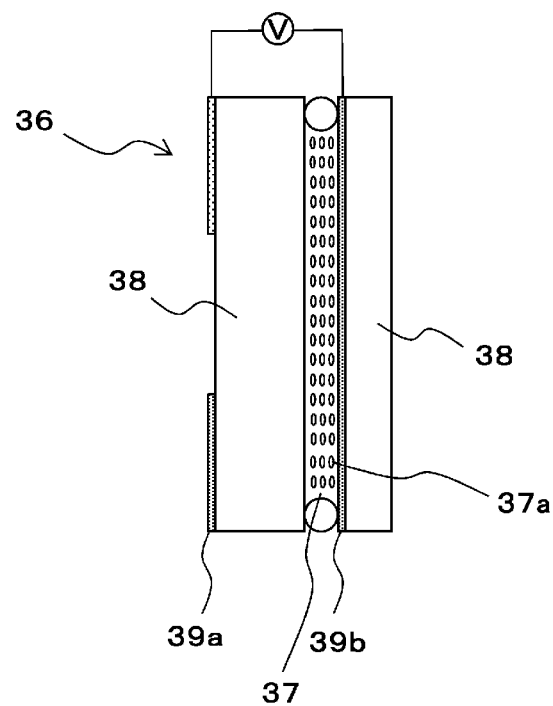
FIG. 2B is a schematic diagram showing the concept of a liquid crystal lens.

Further, the varifocal lens 3 may be a liquid crystal lens which can implement an autofocus function without using any mechanism to move the lens mechanically like the liquid lens 30. FIG. 2B is a schematic diagram showing the concept of a liquid crystal lens. The liquid crystal lens 36 has a configuration such that a liquid crystal layer 37 having homogeneous molecular arrangement is sealed between plate glass layers 38, 38. On each of the glass plates 38, transparent electrodes 39a, 39b made of metallic oxide are formed. In the liquid crystal lens 36, by applying an electric voltage on the transparent electrodes 39a, 39b and adjusting the applied electric voltage, the orientation state of the liquid crystal molecules 37a varies. In the liquid crystal lens 36, the refractive index varies by changing the orientation state of the liquid crystal molecules 37a, and the focus distance thereof also varies by changing the refractive index. This enables the liquid crystal lens 36, like the liquid lens 30, to change its focal position by adjusting the applied electric voltage to adjust its focus.

Referring back to FIG. 1, the solid-state image sensing device 12, constituting imaging means, is for example, composed of a CMOS image sensor, or the like, and converts an optical signal to an electric signal to output it. The optical-information-reading apparatus 1A receives reflected light from the code symbol 100 spaced therefrom by an optional distance and performs the image formation of it on the solid-state image sensing device 12 by means of the imaging optical system 11 to perform the imaging. This is because contents of the code symbol 100 cannot be decoded if the image is not clearly captured.

The optical-information-reading apparatus 1A controls the imaging optical system 11 to measure the distance to the code symbol 100 so that the focal position is set to the measured distance. Accordingly, the optical-information-reading apparatus 1A is provided with a distance-measuring portion using a laser beam in the camera module 10.

For distance-measuring by laser, two methods are well known. First, is a pulsing technology in which distance is obtained by measuring the delay in time between a start of a laser pulse and the return of the reflection thereof. The other is a parallax technology in which an imaging target is irradiated with light to form spots thereon, locations of the spots on the imaging target are measured and the distance from the imaging target is obtained from the measured locations of the spots.

Since the distance measurement is performed in this embodiment using the parallax method, the optical-information-reading apparatus 1A is provided with ranging lasers 13 as the distance-measuring means. Each of the ranging lasers 13 is configured so that the code symbol 100 is irradiated, with the imaging optical system 11 performing the image formation on the solid-state image sensing device 12, and the light reflected by the code symbol 100 is incident on the solid-state image sensing device 12.

The laser beams from the ranging lasers 13, and the locations of the spots formed on the code symbol 100 varies based on the distance to the code symbol 100. The spots appear as locations of the reflected light that is incident on the solid-state image sensing device 12.

Accordingly, the optical-information-reading apparatus 1A measures the locations of the light, which is irradiated from the ranging laser 13 and reflected by the code symbol 100 and imaged on the solid-state image sensing device 12, so that the distance to the code symbol 100 can be obtained.

In the optical-information-reading apparatus 1A in which the varifocal lens 3 is composed of the liquid lens 30, the relationship between the electric voltage to be applied to the liquid lens 30 and the focal distance is previously determined. By applying the electric voltage corresponding to the distance to the code symbol 100 on the liquid lens 30, the reflected light from the code symbol 100 which is remote therefrom by any optional distance is focused on the solid-state image sensing device 12 by using the imaging optical system 11 to perform the imaging. In the optical-information-reading apparatus 1A in which the varifocal lens 3 is composed of the liquid crystal lens 36, similarly, a relationship between the electric voltage to be applied to the liquid crystal lens 36 and the focal distance is previously determined. By applying the electric voltage corresponding to the distance to the code symbol 100 on the liquid crystal lens 36, the reflected light from the code symbol 100 which is remote therefrom by any optional distance is focused on the solid-state image sensing device 12 by using the imaging optical system 11 to perform the imaging.

Here, since in the liquid lens 30, even if the same electric voltage is applied thereon, the curvature of the boundary surface varies because of variation in the temperature, temperature compensation is required in the optical-information-reading apparatus 1A which is provided with the imaging optical system 11 composed of the liquid lens 30. Thus, the optical-information-reading apparatus 1A is provided with a thermistor 14 in the camera module 10 as temperature-detecting means for detecting temperature of the liquid lens 30 at a position near the liquid lens 30.

The optical-information-reading apparatus 1A compensates the focal position of the liquid lens 30 drawn from any distance information on the distance to the code symbol 100, which is obtained using the ranging laser 13, using temperature information detected by the thermistor 14, to realize the correct autofocus. In the liquid crystal lens 36, similarly, it is also possible to realize the correct autofocus using temperature compensation.

It is to be noted that the optical-information-reading apparatus 1A may be provided with a lighting LED 15 for irradiating the code symbol 100 with guide light indicating a range in which the code symbol 100 is readable, in the camera module 10. The lighting LED 15, however, is suitably provided so that it may not be equipped, based on the shape of the apparatus or the purpose thereof.

The decoder 200 is provided with an application specific integrated circuit (ASIC) 210 as controlling means to control the focus adjustment and the imaging to be performed in the camera module 10 and to control the decoding of the signal output from the camera module 10 and the data transfer. In the ASIC 210, various kinds of data are written and/or read into/from SDRAM 220, FROM 230, and the like. Although the optical-information-reading apparatus 1A is a scanner which can read barcode and two-dimensional code, it is possible to read any characters if it is equipped with OCR software. The ASIC 210 may be a combination of CPU and LSI such as a field programmable gate array (FPGA).

The optical-information-reading apparatus 1A may obtain electric voltage information according to the measured distance to the code symbol 100 by storing in ASIC 210 a table of the relationship between the distance to the code symbol 100 and the electric voltage to be applied to the liquid lens 30. The distance to the code symbol 100 can be obtained by measuring the location of the light irradiated from the ranging laser 13 and reflected by the code symbol 100 to the solid-state image sensing device 12.

Further, a compensation table by the periphery temperature of the liquid lens 30 is stored in the ASIC 210. Although the liquid lens 30 is required to have a period of waiting time before an image is imaged after the electric voltage is applied thereto, the period of waiting time before the image is imaged varies based on the temperature. The period of waiting time is generally short in case of high temperature. For example, the period of waiting time at 60° C. is much shorter than the period of waiting time at 25° C. Accordingly, the table of the relationship between the periphery temperature of the liquid lens 30 and the period of imaging waiting time is stored in the ASIC 210.

Thus, by referring to the table of the relationship between the distance to the code symbol 100 and the electric voltage to be applied on the liquid lens 30, the compensation table relating to the periphery temperature of the liquid lens 30 and the table on the relationship between the periphery temperature of the liquid lens 30 and the period of imaging waiting time, it is possible to realize an optimal focus adjustment and capture a clear image. In the liquid crystal lens 36, similarly, by storing a table of the relationship between the distance to the code symbol 100 and the electric voltage to be applied to the liquid crystal lens 36 in the ASIC 210 and referring to these tables, it is also possible to realize an optimal focus adjustment and capture a clear image.

Figure 3:
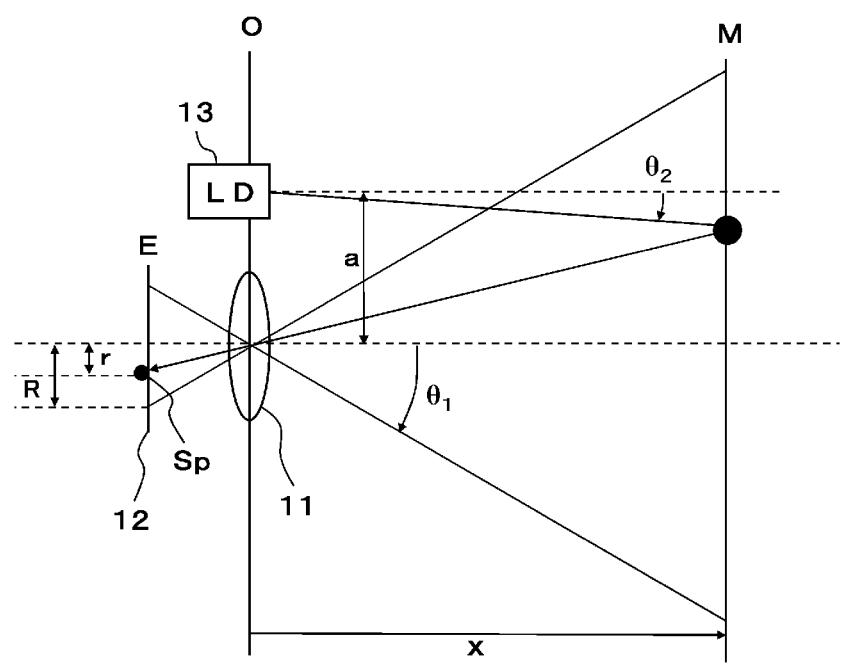
FIG. 3 is a diagram of an optical system showing a method of measuring distance by a parallax method.
Figures 4, 5A:
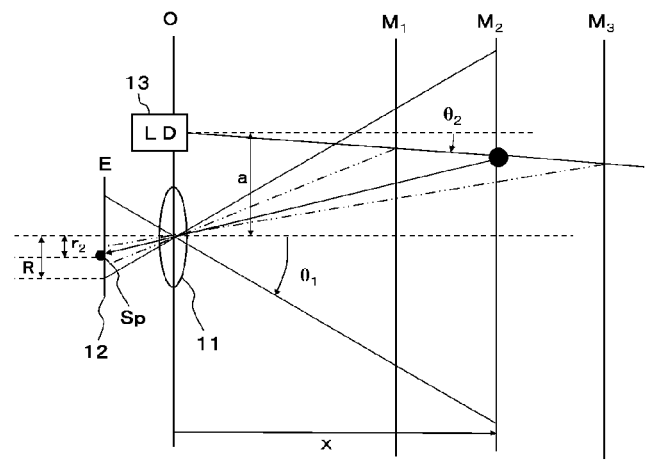
FIG. 4 is a diagram of an optical system showing a method of obtaining the location of a ranging laser required to measure a distance.
FIG. 5A is a table showing a comparison between the measured distance and the calculated values thereof when calculating distance using location information of a ranging laser, which is measured by applying the present invention thereto.

FIG. 3 is a diagram of an optical system showing a method of measuring distance by the parallax method. FIG. 4 is a diagram of an optical system showing a method of obtaining information on a location of a ranging laser spot as a parameter for distance measurement, which is required to measure a distance. The following will describe a method of maintaining precision of distance measurement in the optical-information-reading apparatus 1A to which the parallax method is applied.

In the method of measuring distance using the parallax method, a distance "x" is obtained which is between a subject surface M including the code symbol 100, which is the imaging target, and a plane O including the origin of the imaging optical system 11. System 11 has the main lens 2, which is fixed focal system lens, and the varifocal lens 3 composed of, for example, the liquid lens 30. Distance x is obtained according to the following equation (1).

$$x = \frac{a}{\frac{r}{R}\tan\theta_1 + \tan\theta_2} \quad (1)$$

where "x" is the distance between the subject surface and the origin surface, "a" is the distance between the ranging laser and the optical axis of the imaging optical system in a plane including the origin of the optical axis of the imaging optical system, "r" is the location onto which the laser beam is reflected, "R" is the distance from the center of the solid-state image sensing device to a end point, which is spread by half the angle of view, $\theta_1$ is the half angle of view, and $\theta_2$ is an angle formed by the ranging laser and a plane including the origin of the optical axis of the imaging optical system.

In the equation (1), the distance "a" between the ranging laser 13 and the optical axis of the imaging optical system 11 in a plane O including the origin of the optical axis of the imaging optical system 11, the half angle of view $\theta_1$, an angle $\theta_2$ formed by the ranging laser 13 and the plane O including the origin of the optical axis of the imaging optical system 11, and the distance R from the center of the solid-state image sensing device 12 to a end point, which is spread by half angle of view, are set as design values of the optical-information-reading apparatus 1A. The distance "x" is obtained from the location "r" at which the laser spot Sp is reflected onto an imaging surface E of the solid-state image sensing device 12.

By inverting equation (1), an inverse number $x^{-1}$ of the distance "x" is obtained according to the following equation (2) and precision of distance measurement is given by the following equation (3).

$$x^{-1} = \frac{\frac{r}{R}\tan\theta_1 + \tan\theta_2}{a} \quad (2)$$

$$\frac{d(x^{-1})}{dr} = \frac{\tan\theta_1}{aR} \quad (3)$$

According to equation (3), it is seen that the precision of distance measurement is fixed by the distance "a" (from the optical axis of the imaging optical system 11 to the ranging laser 13) and the angle $\theta_2$ (formed by the optical axis of the imaging optical system 11 and the ranging laser 13) have no influence on the precision of distance measurement.

Accordingly, taking into consideration the precision of distance measurement, the distance "a" (between) the ranging laser 13 and the optical axis of the imaging optical system 11) is set a design value thereof given by a mechanical dimension in order to avoid any error problem from occurring in a design stage. On the other hand, the angle $\theta_2$ formed by the ranging laser 13 and the optical axis is not required to be set a design value thereof.

However, since the distance "a" of the ranging laser 13 from the optical axis and the angle $\theta_2$ formed by the ranging laser 13 and the optical axis are required in the calculation to obtain the distance "x" to the code symbol 100, the distance "a" and the angle $\theta_2$ are given with a mechanical tolerance which avoids any error problem from occurring.

Accordingly, by measuring the distance "a" of the ranging laser 13 from the optical axis and the angle $\theta_2$ formed by the ranging laser 13 and the optical axis as distance measurement parameters and storing them on a nonvolatile memory in the ASIC 210 shown in FIG. 1, the distance "x" to the code symbol 100 can be obtained accurately. The severe mechanical tolerance on the distance "a" of the ranging laser 13 from the optical axis and the angle $\theta_2$ formed by the ranging laser 13 and the optical axis are not introduced. The precision required to measure a distance can be maintained without any mechanical adjustment when assembling them.

The following will describe a method of obtaining the distance "a" of the ranging laser 13 from the optical axis and the angle $\theta_2$ formed by the ranging laser 13 and the optical axis, which are required to measure the distance, without any mechanical adjustment with reference to FIG. 4.

Subject surfaces $M_1$, $M_2$, . . . , and $M_p$ are positioned at fixed distance $x_1, x_2, \ldots,$ and $x_p$ and produce spots at locations $r_1, r_2, \ldots,$ and $r_p$ on the imaging surface E via reflected light from the ranging laser 13, irradiating with a laser beam each of the subject surfaces.

The above-mentioned equation (1) can be deformed to the following equation (4). The calculation of $y_i = -x_i r_i / R \tan \theta_1$ is performed using the half angle of view $\theta_1$, which is a calculated value. The distance "R" from the center of the solid-state image sensing device 12 to the end point is spread by the half angle of view. Then, the least squares method is applied to $x_i$ and $y_i$ so that an inclination dy/dx and an intercept $y_0$ are obtained.

By using the inclination and the intercept thus obtained, the distance "a" of the ranging laser 13 from the optical axis and the angle, $\tan \theta_2$, formed by the ranging laser 13 and the optical axis, which are required to measure the distance are obtained according to the following equations (5) and (6).

$$-\frac{xr}{R}\tan\theta_i = \tan\theta_2 \times x - a \quad (4)$$

$$\tan\theta_2 = \frac{dy}{dx} \quad (5)$$

$$a = -y_0 \quad (6)$$

From the above, the most efficient method of obtaining the distance "a" of the ranging laser 13 from the optical axis and the angle, $\tan \theta_2$, formed by the ranging laser 13 and the optical axis, which are required to measure the distance, is to position the subject surface at two fixed points, having a distance of the closest approach and the furthest distance, fixed by the specification thereof and to obtain two parameters, "a" and $\tan \theta_2$ on the distance information and the angle information.

Figures 6B, 7A:
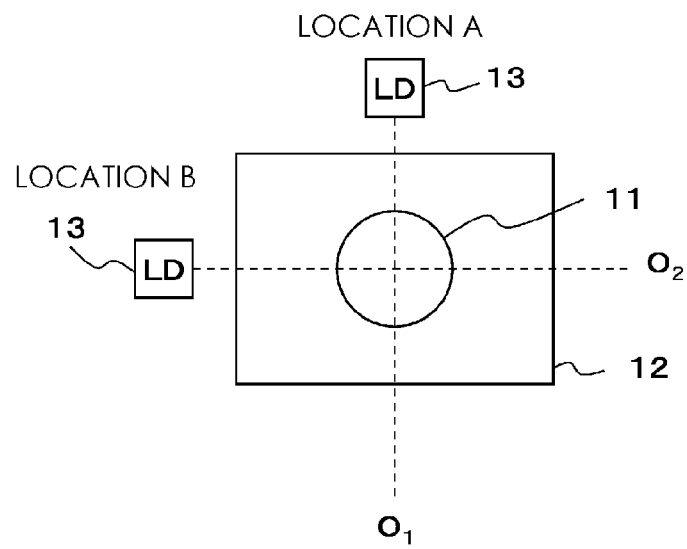
FIG. 6B is a table showing a comparison between the measured distance and the calculated values thereof when determining location of the ranging laser based on only mechanical tolerance and calculating distance using designed values without any mechanical adjustment.
FIG. 7A is an illustration showing the relationship between the locations of the ranging lasers and laser spots formed on an imaging surface of a solid-state image sensing device.

FIG. 5A and FIG. 5B are tables each showing a comparison result between the measured distance and the calculated values thereof when calculating distance using location information of the ranging laser (the distance "a" from the optical axis and the angle $\theta_2$ formed by the optical axis), which is measured by applying this invention thereto. FIG. 6A and FIG. 6B are tables each showing a comparison result, as a comparison example, between the measured distance and the calculated values thereof when determining the location of the ranging laser by only the mechanical tolerance and calculating the distance using designed values without any mechanical adjustment. It is clear that between the example to which the invention is applied and the comparison example, there is a detection precision of more than 10 times when comparing the inverse numbers $x^{-1}$ of the calculated distance values.

Figure 7B:
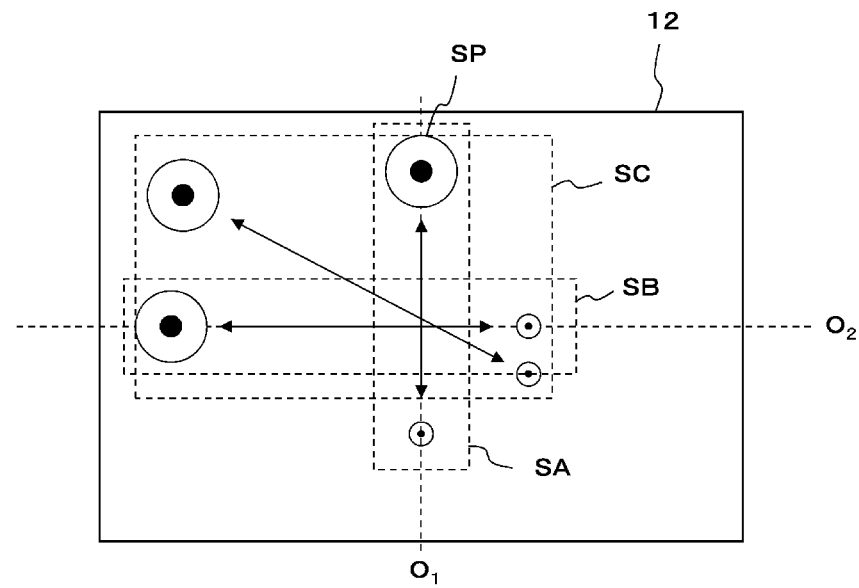
FIG. 7B is an illustration showing the relationship between the locations of the ranging lasers and laser spots formed on an imaging surface of a solid-state image sensing device.
Figure 8A:
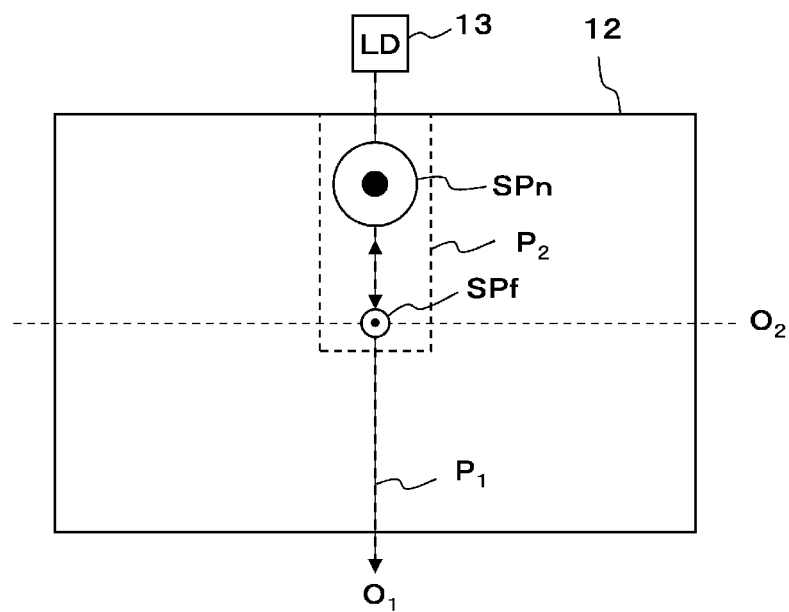
FIG. 8A is an illustration showing a method of obtaining a range for imaging the laser spots and searching them.
Figures 8B, 9:
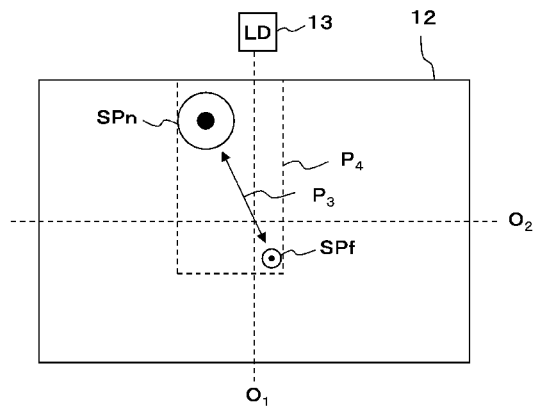
FIG. 8B is an illustration showing a method of obtaining a range for imaging the laser spots and searching them.
FIG. 9 is a table showing periods of time required for a measurement when calculating distance using the search range obtained from the location information of the laser spots measured by applying the present invention thereto.

FIG. 7A and FIG. 7B are illustrations each illustrating a relationship between the locations of the ranging lasers and laser spots formed on an imaging surface of the solid-state image sensing device. FIG. 8A and FIG. 8B are illustrations each illustrating a method of imaging the laser spots and obtaining a range for searching them. The following will describe a method of reducing the period of time required to measure the distance in the optical-information-reading apparatus 1A, to which the parallax method is applied.

In the above-mentioned parallax method, the period of time it takes to measure the distance is dependent on an area S in which the laser spots Sp produced by the reflected light of the ranging lasers 13 move on the imaging surface E of the solid-state image sensing device 12. When making the area S in which the laser spots Sp move minimum, we minimize the period of time for imaging and the range for searching the laser spots Sp on the imaging surface E of the solid-state image sensing device 12, thereby minimizing the period of time it takes to measure the distance.

Generally, as shown in FIG. 7A, when installing the ranging lasers 13 on the center axes $O_1$, $O_2$ of the solid-state image sensing device 12, the range in which the laser spots Sp move may be minimized as shown in FIG. 7B. For example, when installing the ranging laser 13 at a location A on the center axis $O_1$ of the solid-state image sensing device 12, as shown in FIG. 7A, the range in which the laser spots Sp move on the imaging surface E of the solid-state image sensing device 12 is limited within an area SA extending along the center axis $O_1$ of the solid-state image sensing device 12, based on the distance to the subject surface M, as shown in FIG. 7B. Further, when installing the ranging laser 13 at a location B on the center axis $O_2$ of the solid-state image sensing device 12 as shown in FIG. 7A, the range in which the laser spots Sp move on the imaging surface E of the solid-state image sensing device 12 is limited within an area SB extending along the center axis $O_2$ of the solid-state image sensing device 12, based on the distance to the subject surface M as shown in FIG. 7B.

However, in fact, even when a design is adopted such that the ranging lasers 13 are installed on the center axes of the solid-state image sensing device 12, the optical axis of any of the ranging lasers 13 is inclined according to the adjustment in the assembly thereof, which becomes a system moving within a range of the area SC shown in FIG. 7B. In the past, it has been devised to shorten the period of time required to measure the distance by adjusting the inclination of the optical axis of each of the ranging lasers 13 mechanically when assembling them, so that the area in which the laser spots move is minimized. However, it has been too troublesome and has taken too much time to adjust the same, which has caused an increase in the cost thereof. If the area in which the laser spots move is set to be within a range taking into consideration the variation in the optical axes of the ranging lasers, the period of time required to measure the distance has been too long.

Accordingly, the following will describe a method of minimizing the period of time required to measure the distance without any mechanical adjustment when assembling the ranging lasers 13, with reference to FIGS. 8A and 8B. When the subject surfaces M are positioned at two fixed points, having the distance of the closest approach and the furthest distance, which are fixed by the specification thereof, the locations of the laser spots Sp of the ranging lasers 13, which are formed on the imaging surface E of the solid-state image sensing device 12, are measured as the parameters for distance measurement. They are then stored in a nonvolatile memory of the ASIC 210 shown in FIG. 1.

Further, when imaging the laser spots Sp for measuring the distance, by imaging the smallest image range including the laser spots Sp at two fixed points having a distance of the closest approach and the furthest distance, for example, by imaging a rectangular range thereof, the period of time required to obtain the image for the distance measurement is shortened. Further, when searching for the laser spot Sp, the search starts on an average axis extending through two points: the laser spot Spn corresponding to the distance of the closest approach and the laser spot Spf corresponding to the furthest distance, for example.

FIGS. 8A and 8B show examples in which the ranging laser 13 is installed on the vertical center axis $O_1$ of the solid-state image sensing device 12. FIG. 8A shows a case where no errors occur in the assembly thereof, and the distance "a" from the optical axis of the ranging laser 13 and the angle $\theta_2$ formed by the optical axis and the ranging laser 13 correspond to designed values thereof. In this case, the laser spot Spn corresponding to the distance of the closest approach and the laser spot Spf corresponding to the furthest distance are formed on the vertical center axis $O_1$ at the imaging surface E of the solid-state image sensing device 12 so that the search axis $P_1$ of the laser spots Sp starts on the line corresponding to the vertical center axis $O_1$ of the solid-state image sensing device 12. Further, obtaining the image for the distance measurement is carried out in an imaging region $P_2$ which is symmetrical about the vertical center axis $O_1$ of the solid-state image sensing device 12.

FIG. 8B shows a case where errors occur in the assembly thereof, and the distance "a" from the optical axis of the ranging laser 13 and the angle $\theta_2$ formed by the optical axis and the ranging laser 13 do not correspond to designed values thereof. In this case, the search axis $P_3$ of the laser spots Sp starts on a line that passes through the middle of the two points, the laser spot Spn corresponding to the distance of the closest approach and the laser spot Spf corresponding to the furthest distance, and is parallel to the vertical center axis $O_1$ of the solid-state image sensing device 12. Further, obtaining the image for the distance measurement is carried out to an imaging region $P_4$ which is almost symmetrical about the search axis passing through the middle of the two laser spots.

Figures 10, 11:
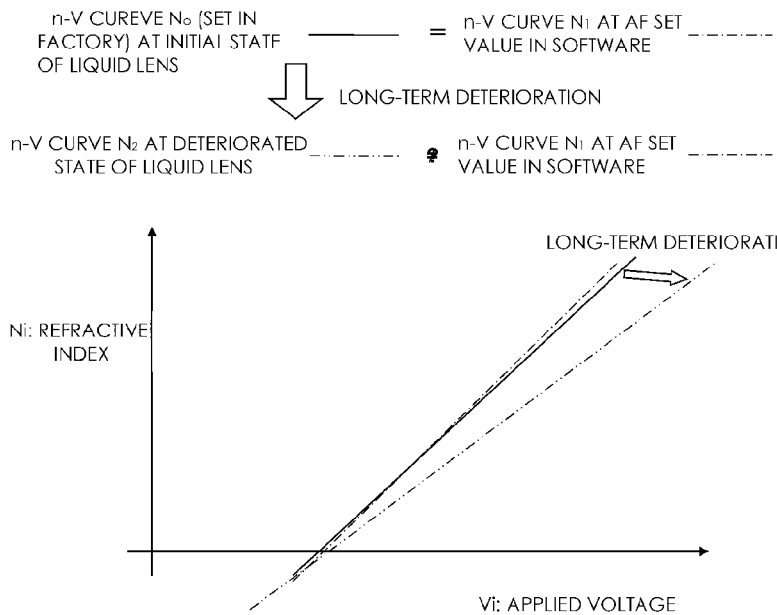
FIG. 10 is a table showing periods of time required for a measurement when calculating distance using the search range in which dispersion of an optical axis is taken into consideration.
FIG. 11 is a graph showing the relationship between applied electric voltage and refractive index under long-term deterioration.

FIG. 9 is a table showing periods of time required for a measurement when calculating a distance using the search range obtained from the location information of the laser spots measured by applying this invention thereto. FIG. 10 is a table showing periods of time, as comparison examples, required for a measurement when calculating a distance using the search range in which dispersion of an optical axis is taken into consideration. It is clear that in the example to which this invention is applied and the comparison example, the period of time required to measure the distance is reduced by about half.

In the liquid lens 30 shown in FIG. 2A, the curvature of the boundary surface 35 between the solution 31 and the oil 32 varies based on the electric voltage applied thereto. When the curvature in the liquid lens 30 varies, the refractive index of the liquid lens 30 also varies, so that the applied electric voltage required to focus on the imaging target which exists remotely therefrom by any optional distance is fixed one-to-one. Namely, a comparison relationship between the refractive index $n_i$ of the liquid lens 30 and the applied electric voltage $V_i$ is stored.

Accordingly, a relationship between distance information L(=x) to the code symbol 100, which is a imaging target, and electric voltage information Vn to be applied to the liquid lens 30 in order to focus on the code symbol 100 which exists on a location specified by the distance information L, is measured, to produce a table TB relating the distance and electric voltage, and it is then stored in nonvolatile memory in the ASIC 210.

Thus, it is possible to obtain the electric voltage information $V_n$ based on the distance to the code symbol 100 measured by the above-mentioned parallax method or the like. The optical-information-reading apparatus 1A shown in FIG. 1A images the code symbol 100 by autofocus using an open loop algorithm, which obtains the distance information L, obtains the electric voltage information $V_n$ based on the distance information L and controls the liquid lens 30.

Next, when the time has elapsed or the apparatus is preserved under a high-temperature state, the solution or the oil in the liquid lens 30 deteriorates, so that there may be a case where the setting in the table TB on the distance and electric voltage, which was previously produced and stored, does not correspond to the state of the liquid lens 30.

FIG. 11 is a graph showing the relationship between the applied electric voltage and the refractive index under the long-term deterioration. The solid line indicates n-V curve $N_0$ of the relationship between the applied electric voltage and the refractive index at an initial state of the liquid lens 30. The alternate long and short dash line indicates n-V curve $N_1$ of the relationship between the applied electric voltage and the refractive index in the table of the distance and electric voltage stored in the optical-information-reading apparatus 1A. The alternate long and two short dashes line indicates n-V curve $N_2$ of the relationship between the applied electric voltage and the refractive index at a deteriorated state of liquid lens 30.

The refractive index on which the focus can be performed based on the distance obtained by the measurement when referring to the table TB of the distance and electric voltage and applying the electric voltage on the liquid lens 30 is shown in FIG. 11 using the n-V curve $N_1$ of the alternate long and short dash line. In the liquid lens 30 at the initial state thereof, as indicated by the n-V curve $N_0$ of solid line, the refractive index is obtained on which the focus can be performed based on the distance obtained by the measurement. On the other hand, in the liquid lens 30 under the deteriorated state thereof because of the long-term deterioration, the refractive index on which the focus can be performed based on the distance obtained by the measurement is obtained from the n-V curve $N_2$ of alternate long and two short dashes lines shown in FIG. 11.

Accordingly, if the optical-information-reading apparatus 1A does not carry out the reading normally because the code symbol 100 is impossible to be decoded when imaging the code symbol 100 by autofocus using the open look algorithm which obtains the distance information L, obtains the electric voltage information $V_n$ based on the distance information L and controls the liquid lens 30, it images the code symbol 100 using a closed look algorithm which controls the liquid lens 30 so as to focus thereon from the image imaged by the solid-state image sensing device 12. Further, since the distance information L to the code symbol 100 may be obtained, the electric voltage information $V_n$ when being able to focus on the code symbol 100 using the closed loop algorithm is obtained as correction data and the deterioration of the liquid lens 30 is discovered.

Figure 12:
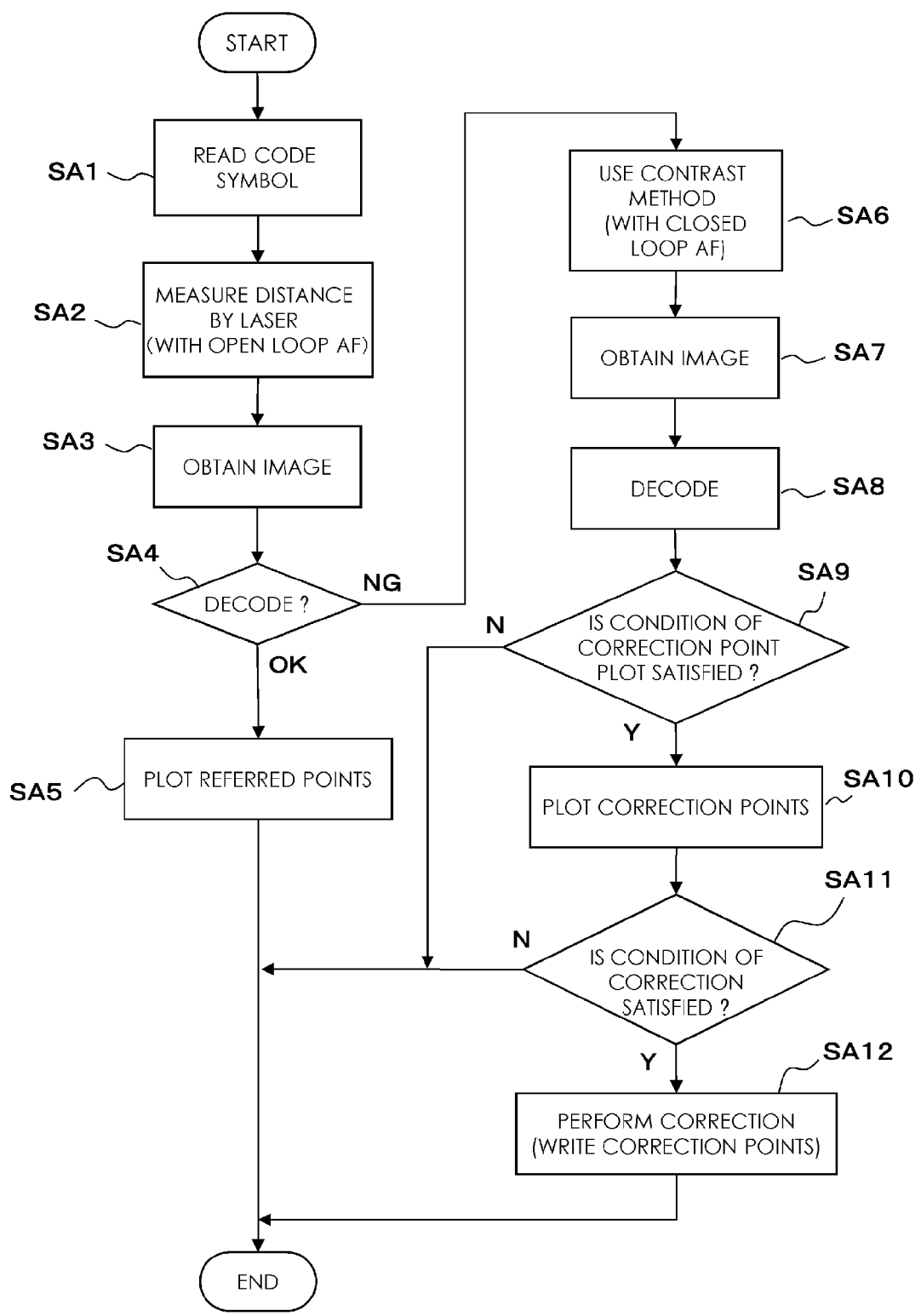
FIG. 12 is a flowchart showing a process for learning deterioration of the liquid lens under long-term deterioration.
Figure 13:
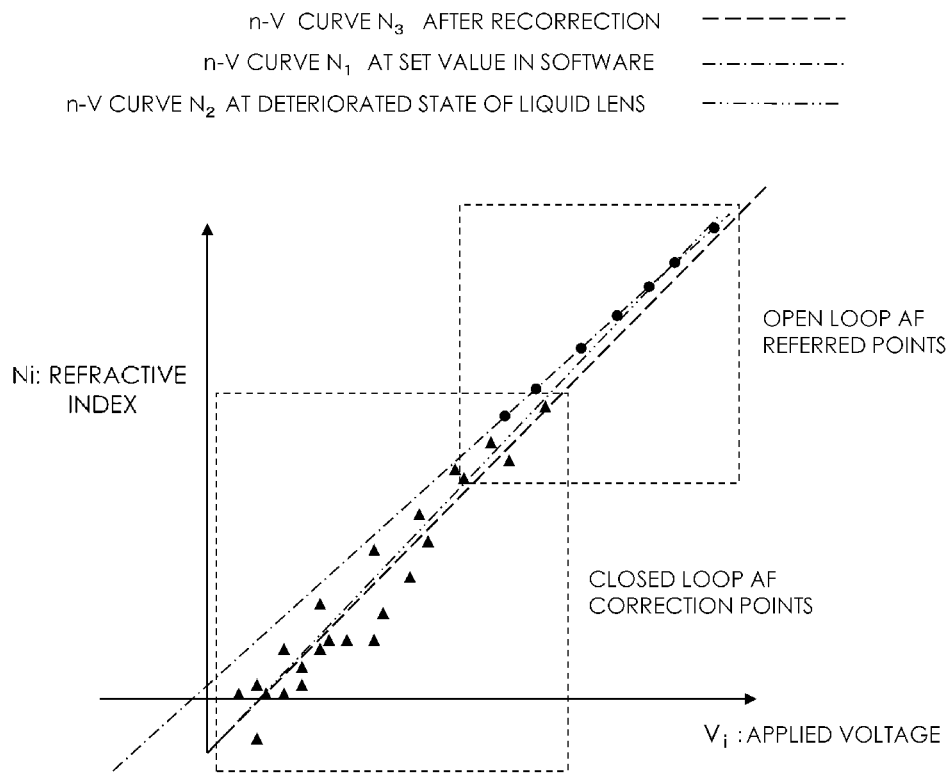
FIG. 13 is a graph showing the learning result of applied electric voltage under long-term deterioration.

FIG. 12 is a flowchart showing a processing for learning of the deterioration of the liquid lens under the long-term deterioration. FIG. 13 is a graph showing the learning result of the applied electric voltage under the long-term deterioration. At a step SA1 of FIG. 12, reading the code symbol 100 starts under a predetermined operation. At a step SA2 of FIG. 12, it images the code symbol 100 using the open loop algorithm.

Namely, the optical-information-reading apparatus 1A obtains the distance information L on the distance to the code symbol 100 from the locations of the laser spots Sp, which are irradiated from the ranging laser 13, are reflected by the code symbol 100 and are formed on the imaging surface E of the solid-state image sensing device 12. It also obtains the electric voltage information $V_n$ based on the distance information L by referring to the table TB relating to the distance and electric voltage which is previously stored in the ASIC 210 and controls the liquid lens 30 to obtain the image of the code symbol 100 via the solid-state image sensing device 12 at a step SA3 shown in FIG. 12.

When the optical-information-reading apparatus 1A obtains the image of the code symbol 100 via the solid-state image sensing device 12, the decoder 200 decodes the code symbol 100 at a step SA4 shown in FIG. 12. If it is possible to decode the code symbol 100 at the step SA4 shown in FIG. 12, then the optical-information-reading apparatus 1A outputs the decoded data and temporarily stores the distance information L and the electric voltage information $V_n$, thus obtained, as the referred data at a step SA5 shown in FIG. 12.

If it is impossible to decode the code symbol 100 at step SA4 shown in FIG. 12, then the optical-information-reading apparatus 1A controls the liquid lens 30 using the closed loop algorithm in which the electric voltage to be applied to the liquid lens 30 changes so as to focus thereon based on the image imaged by the solid-state image sensing device 12 at a step SA6 shown in FIG. 12.

In the imaging optical system 11 using he liquid lens 30, the closed loop algorithm which focus on the imaging target to be imaged by the solid-state image sensing device 12 uses, for example, a contrast method is applied in which the electric voltage applied to the liquid lens 30, which controls the curvature of the liquid lens 30, changes so that the contrast (spatial frequency) of the image imaged by the solid-state image sensing device 12 becomes highest When focusing on the code symbol 100, the optical-information-reading apparatus 1A obtains its image via the solid-state image sensing device 12 at a step SA7 shown in FIG. 12, and it decodes the code symbol 100 via the decoder 200 at a step SA8.

At a step SA9 shown in FIG. 12, the optical-information-reading apparatus 1A determines whether or not a predetermined condition for collecting the electric voltage information $V_n$ when focusing on the code symbol 100 using the closed loop algorithm as correction data is satisfied. If the predetermined condition for collecting it as correction data is satisfied, then the optical-information-reading apparatus 1A temporarily stores the distance information L and the electric voltage information $V_n$, thus obtained, as the correction data at a step SA10 shown in FIG. 12.

At step SA11 shown in FIG. 12, the optical-information-reading apparatus 1A determines whether or not a predetermined condition for setting the electric voltage information $V_n$ when focusing on the code symbol 100 using the closed loop algorithm as correction data is satisfied. If the predetermined condition for setting it as the correction data is satisfied, then the optical-information-reading apparatus 1A writes the distance information L and the electric voltage information $V_n$, thus collected, in FROM 230 as the correction data to set them as new set values at a step SA12 shown in FIG. 12.

In FIG. 13, the relationship between the applied electric voltage and the refractive index in the table on the distance and electric voltage stored in the optical-information-reading apparatus 1A is shown by the alternate long and short dash line indicating the n-V curve $N_1$. The relationship between the applied electric voltage and the refractive index at a deteriorated state of liquid lens 30 is shown by the alternate long and two short dashes line indicating the n-V curve $N_2$. The relationship between the applied electric voltage and the refractive index after the correction is shown by the broken line indicating the n-V curve $N_3$. Further, the referred points of the open loop algorithm are indicated by dots and the correction points of the closed loop algorithm are indicated by triangles.

As shown in FIG. 13, in a region in which the electric voltage value to be applied to the liquid lens 30 is high, the liquid lens 30 has a refractive index such that the focus is performed on the distance obtained by the measurement using the open loop algorithm in which the electric voltage information Vn corresponding to the measured distance information L is applied to the liquid lens 30. On the other hand, in a region in which the electric voltage value to be applied to the liquid lens 30 is low, when the liquid lens 30 has deteriorated, the liquid lens 30 has no refractive index such that the focus is performed at the distance obtained by the measurement.

Accordingly, the algorithm is changed to the closed loop algorithm. If the electric voltage information $V_n$ when focusing on the code symbol 100 is obtained as the correction data to learn the deterioration of the liquid lens 30, it is clear that the n-V curve $N_3$ indicating the applied electric voltage and the refractive index after the correction comes closer to the n-V curve $N_2$ indicating the relationship between the applied electric voltage and the refractive index at a deteriorated state of liquid lens 30.

Figure 14:
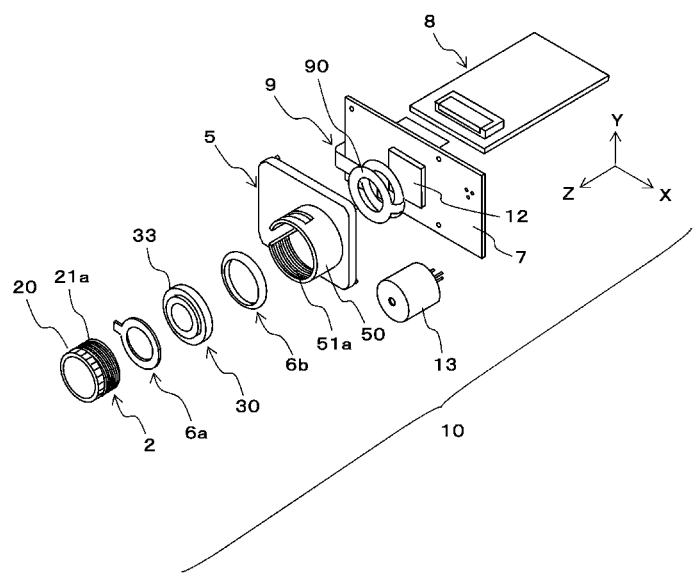
FIG. 14 is an exploded perspective view of a camera module which is equipped with the liquid lens, showing an example thereof according to this embodiment.

FIG. 14 is an exploded perspective view of a camera module, which is equipped with the liquid lens, showing an example thereof according to this embodiment. In the camera module 10 according to this embodiment, the main lens 2 and the liquid lens 30 are assembled to a camera body 5.

The main lens 2 is configured so that single or plural optical lens(es) is/are housed in a cylindrical housing 20. In the main lens 2, a screw portion 21a is formed on an outer circumference of the housing 20.

In the liquid lens 30, an electrode, not shown, connecting with the electrode 34a and an electrode connecting with the electrode 34b are formed on a part of an outer periphery of the cylindrical container 33 sealing the solution and the oil as described on FIG. 2A.

The camera body 5 is provided with a lens-mounting portion 50 in which a cylindrical space is formed so as to fit outer shapes of the main lens 2 and the liquid lens 30, both of which have cylindrical shapes. The lens-mounting portion 50 allows optical axes of the main lens 2 and the liquid lens 30 to coincide by limiting their position along the X-Y directions that are orthogonal to the optical axes when mounting the main lens 2 and the liquid lens 30 thereon with them being put one on the top of another along the optical axis.

In the camera body 5, a screw portion 51a with which the screw portion 21a formed on the housing 20 of the main lens 2 is engaged is formed on an inner circumference of the lens-mounting portion 50 and when mounting the main lens 2 on the lens-mounting portion 50 and engaging the screw portion 21a of the main lens 2 with the screw portion 51a of the lens-mounting portion 50, the main lens 2 is fixed at a forward end of the camera body 5.

The camera module 10 is provided with a packing 6b held between the lens-mounting portion 50 of the camera body 5 and the liquid lens 30 and a spacer 6a held between the main lens 2 and the liquid lens 30. The packing 6b has a ring shape, is made by, for example, silicon. The packing 6b limits the position of the liquid lens 30 in a Z direction along the optical axis thereof.

The camera module 10 is provided with a base board 7 mounting the solid-state image sensing device 12, a main board 8 performing any signal processing such as decoding and a flexible printed circuit board (FPC) 9 connecting the liquid lens 30, the base board 7 and the main board 8. On the base board 7, the camera body 5 is mounted. On the base board 7, the ranging laser 13 constituting a distance-measuring portion is also mounted. On the base board 7, an outer case, not shown, for covering the camera body 5 and the ranging laser 13 is further installed, which protects the camera body 5 on which the main lens 2 and the liquid lens 30 are mounted and the ranging laser 13. Although, in this embodiment, the base board 7 and the main board 8 have been separately configured, the base board 7 and the main board 8 may be configured so as to be formed as one board.

The flexible printed circuit board 9 is provided with a ring shaped electrode portion 90 to be connected to an electrode, not shown, of the liquid lens 30. The electrode portion 90 is configured so as to have a shape so that it is fitted into the lens-mounting portion 50 of the camera body 5.

In the camera module 10, the thermistor 14 for detecting temperature at the liquid lens 30 and a position near the liquid lens 30 is mounted, for example, near the electrode portion 90 of the flexible printed circuit board 9. Temperature information detected by the thermistor 14 is transferred to the main board 8 through the flexible printed circuit board 9.

The camera module 10 is assembled so that the ranging laser 13 is installed to the camera body 5, the camera body 5 installing the ranging laser 13 is fixed on the base board 7 mounting the solid-state image sensing device 12 and the like using an adhesive, and the ranging laser 13 is fixed on the base board 7 using solder.

Next, the flexible printed circuit board 9 is connected to the base board 7 and one electrode 90 of the flexible printed circuit board 9 and the packing 6b are inserted into the lens-mounting portion 50 of the camera body 5 with the packing 6b being below the other.

Next, the liquid lens 30 is inserted into the lens-mounting portion 50 of the camera body 5 and the other electrode 90 of the flexible printed circuit board 9 is inserted thereinto with it being above the liquid lens 30. The spacer 6a is inserted thereinto above the electrode 90 of the flexible printed circuit board 9, the main lens 2 is mounted on the lens-mounting portion 50 and the screw portion 21a of the main lens 2 is engaged with the screw portion 51a of the lens-mounting portion 50.

Thus, in the camera module 10, one electrode 90 of the flexible printed circuit board 9 is held between the main lens 2 and the liquid lens 30 and the packing 6b and the other electrode 90 of the flexible printed circuit board 9 is held between the liquid lens 30 and the lens-mounting portion 50 of the camera body 5 so that the position of the liquid lens 30 on Z axis along the optical axis is limited by the packing 6b. The packing 6b also pushes the liquid lens 30 toward a direction of the main lens 2 so that the electrode, not shown, of the liquid lens 30 and the electrodes 90 of the flexible printed circuit board 9 are electrically connected to each other. It is to be noted that since the main lens 2 is fixed on the camera body 5 by means of the engagement of the screw portions, this enable fine adjustment of the position thereof along the optical axis to be performed. Further, by inserting the spacer 6a so that the electrodes 90 and the like are not rotated when rotating the main lens 2, the electrodes 90, the liquid lens 30 and the like are protected.

Figure 15:
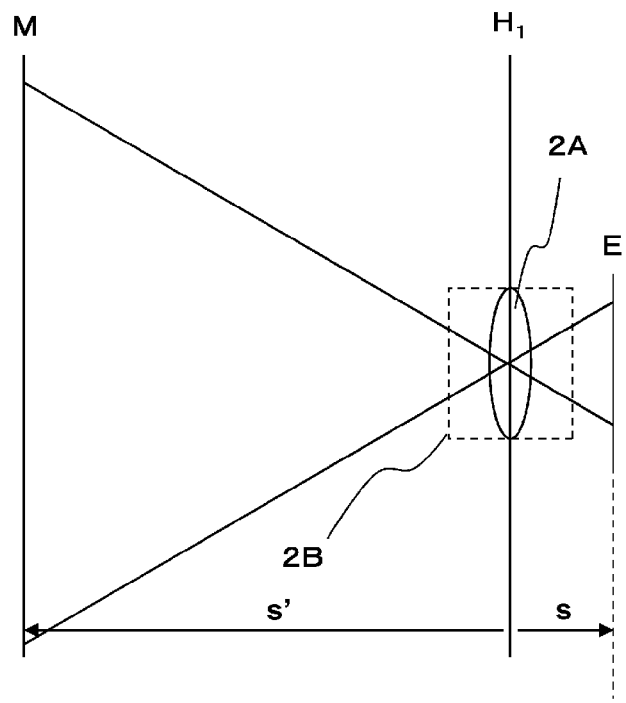
FIG. 15 is an illustration showing an example of an imaging optical system composed of a fixed focus lens system.

FIG. 15 is an illustration illustrating an example of the imaging optical system composed of a fixed focus lens system. In the imaging optical system providing with the fixed focus lens system 2A composed of single or plural optical lens(es), a relationship between a focal distance of the fixed focus lens system 2A and a distance to the subject surface M on which an imaging target exists is represented by the following equation (7) where the direction from the subject surface M to an imaging surface E of the solid-state image sensing device or the like is positive.

$$\frac{1}{s'} = \frac{1}{s} - \frac{1}{f} \tag{7}$$

where "s'" is working distance, "s" is working distance at an image side and "f" is the focal distance.

In a case of the imaging optical system providing with only the fixed focus lens system 2A, an adjustment is carried out to mechanically meet a location of a lens barrel 2B having the fixed focus lens system 2A to a target working distance at the image side in order to focus on the imaging target which exists away therefrom by a predetermined distance (working distance s') if a principal point (rear side principal point) of the imaging optical system is H1.

Further, an amount of variation Δs'(T) of the working distance based on the temperature can be easily measured and the working distance s'(T) at some temperature is represented by the following equation (8) in relation to working distance s'($T_0$) at a reference temperature $T_0$.

$$s'(T) = s'(T_0) - \Delta s'(T) \tag{8}$$

In other words, even when the focal distance f and the working distance "s" at an image side vary based on the temperature to generate Δf(T) and Δs(T) so that the working distance s' changes, a trend of whole Δs'(T) can be measured to be turned into a model, thereby enabling any compensation to be carried out.

Figure 16:
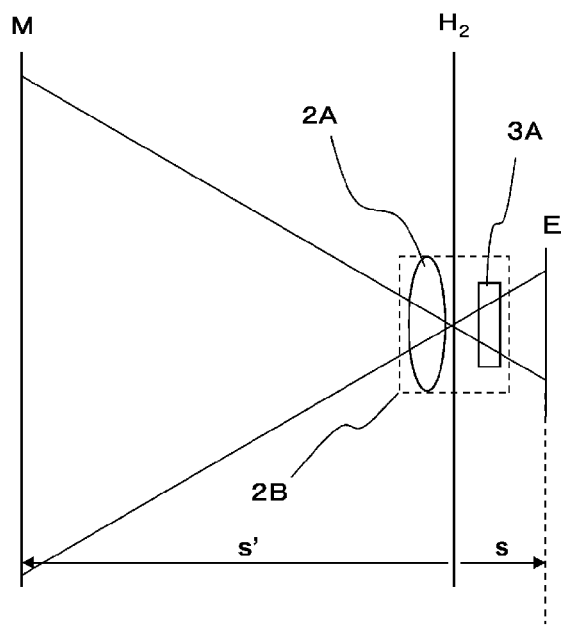
FIG. 16 is an illustration showing an example of an imaging optical system composed of the fixed focus lens system and a varifocal lens system.

FIG. 16 is an illustration illustrating an example of the imaging optical system composed of the fixed focus lens system and a varifocal lens system. The above-mentioned camera module 10 according to this embodiment has had a structure such that the main lens 2 constituting the fixed focus lens system and the liquid lens 30 constituting the varifocal lens system are inserted into the lens-mounting portion 50 of the camera body 5 and the main lens 2 is positioned before the liquid lens 30. There is less aberration in the structure in which the main lens 2 is positioned before the liquid lens 30. Since the liquid lens 30 has small effective aperture, when preparing the imaging optical system of long focal type, so-called low speed lens is configured. On the other hand, in the structure in which the main lens 2 is positioned before the liquid lens 30, the main lens 2 is an optical lens so that it is possible to make the effective aperture large. When preparing the imaging optical system of long focal type, it is possible to configure a high speed imaging optical system. By configuring a high speed imaging optical system, it is possible to improve precision in the decoding of the code symbol. It is to be noted that the angle of view is narrow in the imaging optical system of long focal type so that there is less aberration therein.

Thus, in the imaging optical system providing the fixed focus lens system 2A composed of single or plural optical lens(es) and the varifocal lens system 3A composed of the liquid lens or single or plural optical lens(es), a relationship between the focal distance of the imaging optical system and the distance to the subject surface M is represented by the following equation (9) where the direction from the subject surface M to an imaging surface E is positive.

$$\frac{1}{f} = \phi = \phi_a + \phi_b - t\phi_a\phi_b \tag{9}$$

where $\phi$ is the power of the whole lens system (refraction power), $\phi_a$ is the power of the fixed focus lens system, $\phi_b$, is power of the varifocal lens and "t" is the distance between the principal points in the lens system.

In a case of the imaging optical system in which the fixed focus lens system 2A and the varifocal lens system 3A are positioned in this order from a side of the subject surface M like the camera module 10 according to this embodiment, the fixed focus lens system 2A is adjusted under a state where an optical state of the varifocal lens system 3A is unknown because the varifocal lens system 3A itself which has been previously assembled to the imaging optical system cannot be adjusted.

In other words, the power of whole of the lens system becomes unknown and if a principal point (rear side principal point) of the imaging optical system providing with the fixed focus lens system 2A and the varifocal lens system 3A is H2, the mechanical location of the lens barrel 2B to adjust the working distance "s" to the working distance "s'" at the image side depends on the state of the varifocal lens system 3A. On the contrary, since the location of the lens barrel 2B is fixed if the characteristic of the varifocal lens system 3A is utilized, by adjusting the varifocal lens system 3A, it is possible to match the working distance to the working distance "s'" at the image side. Accordingly, the imaging optical system into which the varifocal lens system is introduced is not required to perform any mechanical adjustment in a case of a system used in only a situation of a certain temperature.

However, since working distance $S0''(T_0)$ of only the fixed focus lens system 2A at the reference temperature $T_0$ and a situation $\phi_b (T_0, V)$ of the varifocal lens system 3A are unknown, the following two methods are utilized as the method of temperature compensation. Here, "V" is input variable to fix the varifocal lens system and is the applied electric voltage when the varifocal lens system is configured to be the liquid lens.

One method is such that the optimal $\phi_b (T, V)$ to obtain a desired s'(T) is fixed by testing operations to change the input V plural times to $\phi_a (T)$, s(T) and t(T) under the real environmental temperature. In this method, a feedback system for autofocus to check a relationship between "V" and s'(T) during the reading operation is required so that its operation is slow.

The other method is such that $\phi_b (T, V)$ which is a target distance z=s' (T) is measured for every individual condition of temperature T and a compensation table or a compensation equation is prepared for every individual or as average value thereof. In this method, a massive amount of operation is required when preparing it for every individual and the precision of s'(T) obtained from $\phi_b (T, V)$ becomes low from a variation in the two optical systems when using the average value.

Accordingly, in this invention, in a case of a system in which the varifocal lens system is added to the fixed focus lens system, a method of maintaining the necessary precision of s'(T) is considered without any necessity of the feedback system.

The temperature compensation in this embodiment is carried out according to the following three steps.

Step 1: Previous Formation of Compensation Equation (1) Characteristic of the temperature variation in a case where only the fixed focus lens system 2A is introduced is previously measured and it is modeled using the following equation (10).

(2) Characteristic of the temperature variation in the varifocal lens system 3A is previously measured and it is modeled using the following equation (11).

$$s_a(T) = s_a(T_0) - \Delta s_a(T) \tag{10}$$

$$\phi_b(T,V) = \phi_b(T_0, V_0) - \Delta\phi_b(T,V) \tag{11}$$

Step 2: Adjustment Step of obtaining Individual Difference (1) one Output $\phi_b (T_0, V_0)$ of the varifocal lens to an input $V_0$ at a certain reference temperature $T_0$ is measured before the assembly and it is recorded or maintained in the system (nonvolatile memory or the like).

(2) $S_a(T_0)$ is calculated from the output $\phi_b (T_0, V_0)$ and it is recorded or maintained in the system (nonvolatile memory or the like).

Step 3: During Operation

When reading, $\phi_b (T, V)$ which is a target distance z=s'(T) is calculated from $\phi_b (T_0, V_0)$ and $S_a(T_0)$ and the input V is input to the varifocal lens.

The following will describe the step 1 for the previous formation of compensation equation in more detail.

<Step 1-1>

The temperature characteristics measured in a case where only the fixed focus lens system 2A is introduced are represented as the following equations (12) through (15).

$$\frac{1}{\bar{s}'(T)} = \bar{n}(T) \tag{12}$$

$$\Delta\bar{n}(T) = \bar{n}(T_0) - \bar{n}(T) \tag{13}$$

$$\Delta T = T_0 - T \tag{14}$$

$$\Delta\bar{n}(T) = \frac{dn}{dT}\Delta T \tag{15}$$

where "s(bar)'" is working distance, "T" is environmental temperature and "$T_0$" is reference temperature.

FIG. 17 is a graph showing the relationship between temperature and deviation of the focus. For example, by using the above-mentioned model equation (10), a coefficient such as dn/dT=0.0219 [/m/K] is obtained. However, since s'($T_0$) is required for every individual, it must be obtained at the adjustment step.

<Step 1-2>

The characteristics of temperature variations in the varifocal lens system 3A are represented as the following equations (16) through (18) using the above-mentioned model equation (11).

$$\phi_b(T, V) = \frac{d\phi_b}{dT}(T) \times V + \phi_0(T) \tag{16}$$

$$\frac{d\phi_b}{dT}(T) = \frac{d\phi_b}{dT}(T_0) + a_2 \times (T_0 - T)^2 + a_1 \times (T_0 - T) + a_0 \tag{17}$$

$$\phi_0(T) = \phi_0(T_0) + b_2 \times (T_0 - T)^2 + b_1 \times (T_0 - T) + b_0 \tag{18}$$

$a_i$ and $b_i$ are coefficients fixed by the specification of the varifocal lens system 3A. However, since $d\phi_b/dT(T_0)$ and $\phi_0(T_0)$ are required for every individual, they must be obtained at the adjustment step.

FIGS. 18A and 18B are illustrations of an optical system each illustrating an adjustment step for obtaining an individual difference. The following will describe the step 2 that is the adjustment step of obtaining the individual difference in more detail.

<Step 2-1>

In the above-mentioned step 1, $d\phi_b/dT(T_0)$ and $\phi_0(T_0)$ for every individual are required in the compensation equation. One output $\phi_b(T_0, V_0)$ of the varifocal lens to an input $V_0$ at a certain reference temperature $T_0$ is measured and it is recorded or maintained in the nonvolatile memory of the system.

The measurement may be carried out such that the varifocal lens system 3A is installed into the fixed focus lens system 2A having a known optical characteristic and the input $V_0$ at which the image obtained by imaging the subject surface M is clearest is searched so that the optical characteristics $\phi_b(T_0, V_0)$ in this moment can be calculated. Particularly, if the fixed focus lens system 2A is prepared so that it is $\phi_b(T_0, V_0)=0$, the value to be stored and maintained may be only $V_0$.

Accordingly, the subject surfaces $M_1, M_2, \ldots, M_p$ are positioned at the fixed distance $x_1, x_2, \ldots, x_p$ and the inputs $V_1, V_2, \ldots, V_p$ are measured at each of which the image obtained by imaging each of the subject surfaces M is clearest. Since $\phi_{bi}$ is obtained from $1/x_i$, $d\phi/dV(T_0)$ is obtained from the relationship between V and $\phi$. In this moment, when the subject surfaces M include two fixed points, the distance of the closest approach and the furthest distance, under the specification of manufactured apparatus, its precision becomes good.

When using $\phi_b(T_0, V_0)$ measured for every individual by the above-mentioned method, $\phi_0(T_0)$ can be obtained because the inclination and one fixed point are known and $d\phi_b/dT(T_0)$ and $\phi_0(T_0)$ thus obtained are stored and maintained in the non-volatile memory.

<Step 2-2>

In the step 2-1, "s'" obtained with $V_0$ fixed so that it is $d\phi_b/dT(T_0)=0$ being incorporated into each of the individuals is $S_a(T_0)$ to be obtained. It is calculated, stored and maintained in the non-volatile memory.

<Step 3>

The following will describe in more detail the step 3 that is a control at the operation time. When reading, input V which is a target distance $z=s'(T)$ is input to the varifocal lens system 3A. Next, the measurement of distance is performed using the above-mentioned parallax method or the like to obtain the distance "z" up to the imaging target. The exterior sensor such as the thermistor 14 shown in FIG. 1 and the like measures the temperature T to obtain $S_a(T)$.

Next, using the above-mentioned equations (9) through (11), $\phi(T)$ is obtained from $S(T_0)$ and s' (T) and $\phi_b(T)$ are obtained from $\phi(T)$. By referring T, then any optimal input coefficient, for example, optimal electric voltage is calculated to obtain V which is input to the varifocal lens system 3A.

FIG. 19 is a table showing a comparison of the precision based on whether or not temperature compensation is performed. It is clear therefrom that average error can be decreased to about a quarter thereof between the case where the imaging is carried out and the temperature compensation is performed using the above-mentioned method and the case where the imaging is carried out and the temperature compensation is not performed.

The present invention is available for a barcode reader and a two-dimensional code reader, and can realize autofocus in a small-scale apparatus.

DESCRIPTION OF CODES

1A: Optical-Information-Reading Apparatus;
10: Camera Module;
11: Imaging Optical System;
12: Solid-State Image Sensing Device;
13: Ranging Laser; and
14: Thermistor.

What is claimed:

1. An optical-information-reading apparatus comprising:
an imaging optical system including a varifocal lens which adjusts a focal position;
an image sensor that images an imaging target of which the imaging optical system performs an image formation;
a distance-measuring system that measures the distance to the imaging target; and
a control unit that is operable to:
(i) calculate the distance to the imaging target using the distance-measuring system,
(ii) control the imaging optical system based on calculated distance information to perform the image formation of the imaging target on the imaging means, and
(iii) control the image sensor to image the imaging target, wherein the control unit calculates the distance to the imaging target using a distance measurement parameter that is characteristic of the apparatus and which has been previously been determined and stored in a memory that is accessible to the control unit;
wherein the distance-measuring system includes a light-emitter for irradiating the imaging target with light;
wherein a distance measurement parameter comprises location information of the distance-measuring system in relation to an optical axis of the imaging optical system, the optical axis passing through an imaging surface of the imaging sensor; and
wherein the control unit calculates, by the distance-measuring system, a location where irradiating light reflected by the imaging target is incident on the image sensor and the distance to the imaging target using the location information.

2. The optical-information-reading apparatus according to claim 1 wherein:
the distance measurement parameter is region information for specifying a region in which the reflected irradiating light is incident on the image sensor, and
the control unit images light that is incident on the region specified by the region information, searches the region specified by the region information, and calculates a location of the light that is incident on the image sensor.

3. The optical-information-reading apparatus according to claim 1 wherein the distance measurement parameter is measured using locations at which reflected light incident on the image sensor and has been reflected by imaging targets away from each other by different distances.

4. The optical-information-reading apparatus according to claim 3 wherein the control unit determines a deterioration of the imaging optical system based on the calculated distance information to the imaging target and control information of the imaging optical system that performs the image formation of the imaging target on the image sensor.

5. The optical-information-reading apparatus according to claim 3 wherein:

(1) the varifocal lens is a liquid lens comprising first and second solutions:
  (a) that have different light refractive indexes,
  (b) that are not mixed,
  (c) that have a boundary surface therebetween,
  (d) that are sealed in a container and
  (e) to which electric voltage is applied to control a shape of the boundary surface,
(2) the imaging optical system includes a temperature detector that detects the temperature of the liquid lens, and
(3) the control unit controls the liquid lens based the temperature detected by the temperature detector.

6. The optical-information-reading apparatus according to claim 3 wherein the imaging optical system includes a fixed focus optical lens having at least one lens, the fixed focus optical lens being positioned before the liquid lens.

7. The optical-information-reading apparatus according to claim 1 wherein:
(1) the varifocal lens is a liquid lens comprising first and second solutions:
  (a) that have different light refractive indexes,
  (b) that are not mixed,
  (c) that have a boundary surface therebetween,
  (d) that are sealed in a container and
  (e) to which electric voltage is applied to control a shape of the boundary surface,
(2) the imaging optical system includes a temperature detector that detects the temperature of the liquid lens, and
(3) the control unit controls the liquid lens based the temperature detected by the temperature detector.

8. The optical-information-reading apparatus according to claim 7 wherein the imaging optical system includes a fixed focus optical lens having at least one lens, the fixed focus optical lens being positioned in front of the liquid lens.

9. An optical-information-reading apparatus comprising:
an imaging optical system including a varifocal lens which adjusts a focal position;
an image sensor that images an imaging target of which the imaging optical system performs an image formation;
a distance-measuring system that measures the distance to the imaging target; and
a control unit that is operable to:
(i) calculate the distance to the imaging target using the distance-measuring system,
(ii) control the imaging optical system based on calculated distance information to perform the image formation of the imaging target on the imaging means, and
(iii) control the image sensor to image the imaging target, wherein the control unit calculates the distance to the imaging target using a distance measurement parameter that is characteristic of the apparatus and which has been previously been determined and stored in a memory that is accessible to the control unit;
wherein the control unit determines a deterioration of the imaging optical system based on the calculated distance information to the imaging target and control information of the imaging optical system that performs the image formation of the imaging target on the image sensor;
wherein the varifocal lens is a liquid lens comprising first and second solutions:
  (a) that have different light refractive indexes,
  (b) that are not mixed,
  (c) that have a boundary surface therebetween,
  (d) that are sealed in a container and
  (e) to which electric voltage is applied to control a shape of the boundary surface;
wherein the imaging optical system includes a temperature detector that detects the temperature of the liquid lens; and
wherein the control unit controls the liquid lens based the temperature detected by the temperature detector.

10. The optical-information-reading apparatus according to claim 9 wherein the imaging optical system includes a fixed focus optical lens having at least one lens, the fixed focus optical lens being positioned in front of the liquid lens.

* * * * *